United States Patent [19]
Schroader

[11] Patent Number: 5,964,338
[45] Date of Patent: Oct. 12, 1999

[54] CONVEYOR APPARATUS HAVING ADJUSTABLE ROLLERS

[75] Inventor: Steven Vann Schroader, Louisville, Ky.

[73] Assignee: Sandvik Sorting Systems, Inc., Louisville, Ky.

[21] Appl. No.: 09/212,424

[22] Filed: Dec. 16, 1998

[51] Int. Cl.$^6$ .................................................. B65G 13/12
[52] U.S. Cl. ......................... 198/782; 198/806; 193/35 R
[58] Field of Search .................................. 198/782, 806, 198/807, 842, 371.3; 193/35 R, 37

[56] References Cited

U.S. PATENT DOCUMENTS

| | | | |
|---|---|---|---|
| 3,342,311 | 9/1967 | Robins | 198/806 |
| 4,241,825 | 12/1980 | Brouwer | 193/35 R X |
| 4,311,226 | 1/1982 | Thompson | 193/35 R |

*Primary Examiner*—James R. Bidwell
*Attorney, Agent, or Firm*—Burns, Doane, Swecker & Mathis, L.L.P.

[57] ABSTRACT

A conveying system includes first and second straight side supports arranged parallel to one another on opposite sides of a longitudinal axis. A plurality of roller structures is provided, each having opposite ends mounted in respective ones of the side supports. An endless web is mounted for travel along the rollers in the direction of the longitudinal axis. Each roller structure is associated with a set of mounting holes formed in the side supports, whereby each set comprises a first series of holes formed in the first side support and a second series of holes formed in the second side support. One end of the roller structure is mounted in a selected one of the holes of the first series, and the other end of the roller structure is mounted in a selected one of the holes of the second series. Each hole of the first series is aligned with a respective hole of the second series to form a pair of aligned holes. Each pair of aligned holes defines a rotary axis, and those rotary axes are oriented obliquely to one another whereby the associated roller structure can be removed from one of the pairs of holes and inserted into another of the pairs of holes to change an angle formed between the roller structure and the longitudinal axis.

4 Claims, 2 Drawing Sheets

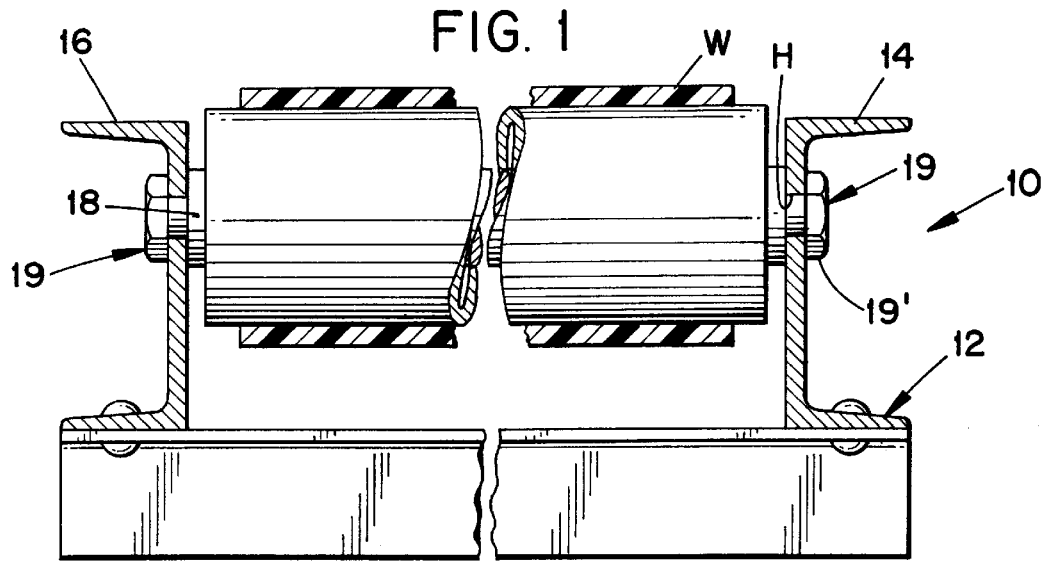
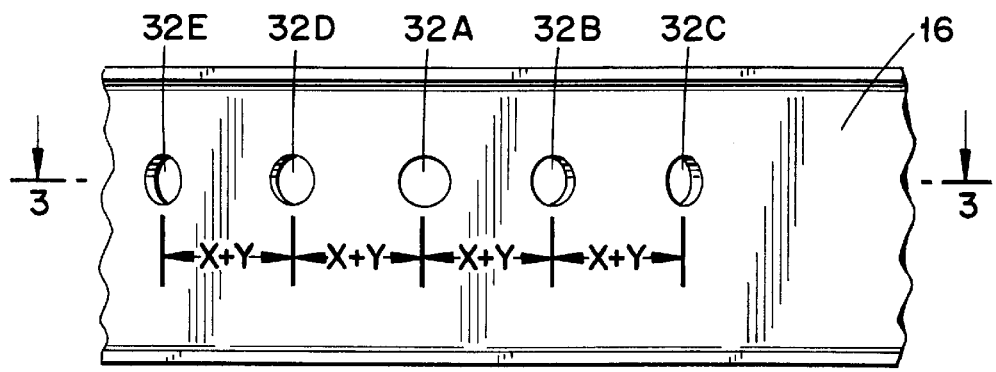
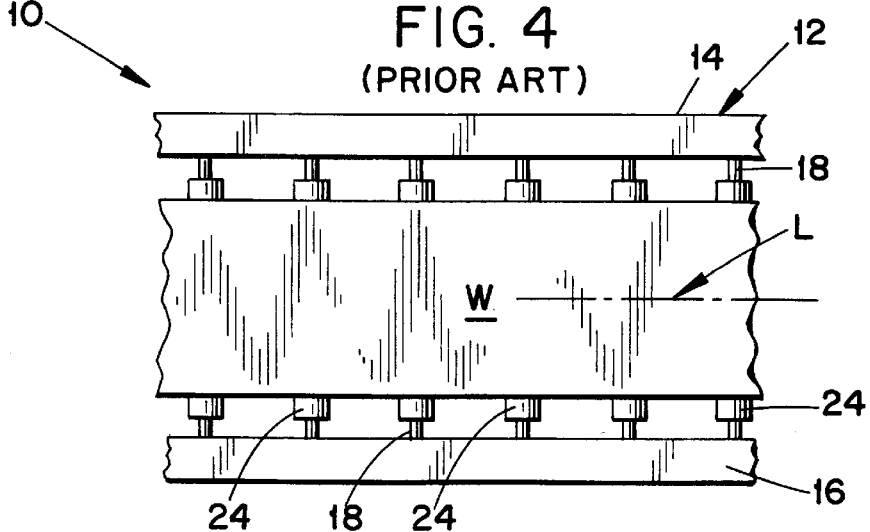

CONVEYOR APPARATUS HAVING ADJUSTABLE ROLLERS

BACKGROUND OF THE INVENTION

The present invention relates to a conveyor system wherein an endless web such as a belt, film, etc. is mounted to travel around support rollers and, in particular to a tracking arrangement which enables the endless web to achieve proper tracking on the conveyor frame.

As shown in FIG. 4, conventional conveyor systems comprise generally parallel rollers 24 over which an endless web W travels. Such a web could be a conveyor belt or a product, e.g. a film, being manufactured or treated. Each roller is rotatably mounted on a stationary shaft 18 by suitable bearings. The ends of each shaft are mounted in respective side supports 14, 16 of a conveyor frame 12, the side supports being straight and arranged in parallel on opposite sides of a longitudinal axis L.

In order to ensure that the web tracks in a direction coinciding with the longitudinal axis, rather than walking toward either of the side supports, it may be necessary to skew some or all of the rollers. Heretofore, that has been achieved by mounting one end of each roller shaft in a block that is movable relative to the respective side support in a direction parallel to the longitudinal axis. By adjusting the block, the inclination of the roller relative to the longitudinal axis is changed.

An operation for producing proper tracking of a web is usually done on a trial-and-error basis. That is, the operator keeps adjusting one or more of the rollers until proper tracking is achieved. The above-described roller-adjusting system is advantageous in that it provides an infinite number of positions of adjustment for each roller. One the other hand, special tools are required for making the adjustments. Furthermore, once a number of adjustments have been made, it is difficult for the operator to remember what the original state of the rollers was, in the event that the operator wishes to return the rollers to the original state following unsuccessful attempts to produce proper tracking.

It would be desirable to provide a simpler, yet highly reliable web tracking arrangement which avoids the above-described problems.

SUMMARY OF THE INVENTION

The present invention relates to a conveying apparatus comprising a support structure which includes first and second straight side supports arranged parallel to one another on opposite sides of a longitudinal axis. Roller structures are mounted in respective ones of the side supports, each roller structure having opposite ends. An endless web is mounted for travel along the rollers in the direction of the longitudinal axis. Each of the roller structures is associated with a set of mounting holes formed in the first and second side supports. Each set of holes comprises a first series of holes formed in the first side support, and a second series of holes formed in the second side support. One end of the associated roller structure is mounted in a selected one of the holes of the first series, and the other end of the associated roller structure is mounted in a selected one of the holes of the second series. The holes of each series are spaced apart in a direction parallel to the longitudinal axis. Each hole of the first series is aligned with a respective hole of the second series to form a pair of aligned holes. Each pair of aligned holes defines a rotary axis. The rotary axes of the pairs of holes of each set of mounting holes are oriented obliquely to one another whereby the associated roller structure can be removed from one of the pairs of holes and inserted into another of the pairs of holes to change an angle between the roller structure and the longitudinal axis.

Each of the roller structures preferably comprises a stationary shaft having its opposite ends mounted in respective ones of the side supports, and a roller mounted for rotation on the shaft.

BRIEF DESCRIPTION OF THE DRAWING

The objects and advantages of the invention will become apparent from the following detailed description of a preferred embodiment thereof in connection with the accompanying drawing in which like numeral designate like element and in which:

FIG. 1 is a vertical sectional view taken through a support structure according to the present invention;

FIG. 2 is a side elevational view of one of two side supports of the support structure;

FIG. 4 is a schematic top plan view of a conventional conveying apparatus in which the present invention could be incorporated.

DETAILED DESCRIPTION OF A PREFERRED EMBODIMENT OF THE INVENTION

Figure 3:
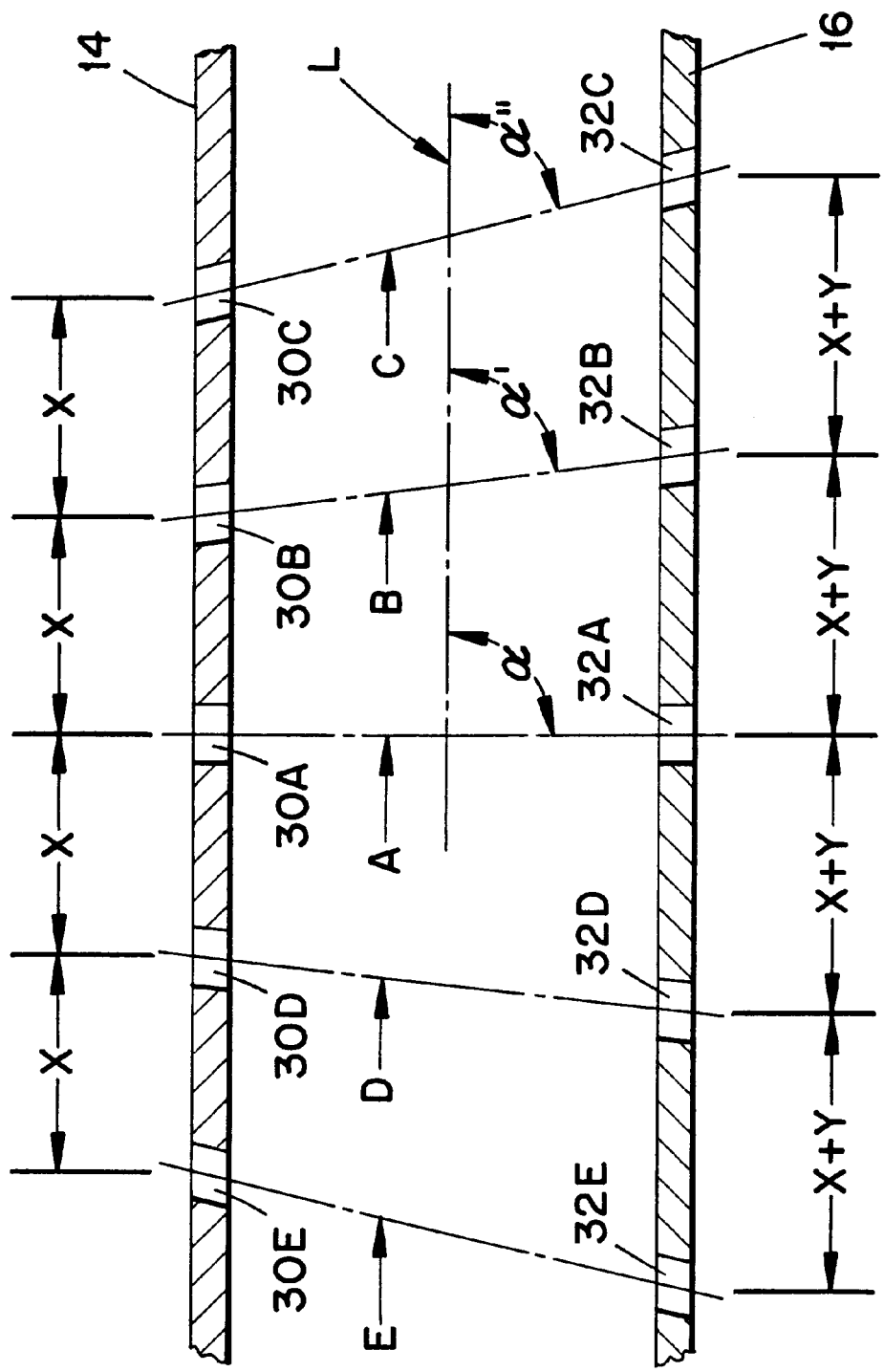
FIG. 3 is a horizontal sectional view taken along the line 3—3 in FIG. 2.

The present invention can be employed in a conventional conveyor system, such as the conveyor system 10 depicted in FIG. 4. Therefore, the numerals used in FIG. 4 will also be used in FIGS. 2 and 3. As explained earlier, that system comprises a conveyor frame 12 that includes first and second straight side supports 14, 16 arranged in parallel on opposite sides of a longitudinal axis L.

Mounted in the conveyor frame are a plurality of conventional roller structures, each comprising a stationary shaft 18 and a roller 24 mounted thereon. Each shaft 18 includes a pair of ends received in respective holes H formed in the side supports 14, 16.

The shaft 18 is fixed against rotation in any suitable conventional manner. For example, each end of the shaft could be hollow and provided with an internal screw thread. Attached to each end of the shaft is an externally threaded bolt having an external screw thread which screws into the hollow end of the shaft, whereby the respective side support 14 or 16 becomes clamped between the shaft and a head 19' of the bolt to frictionally prevent the shaft from rotating. In such a case it may be desirable for the shaft to comprise two telescoping sections to enable both sections to be telescoped together when inserting the shaft between the side supports.

The rollers 24 are rotatably mounted on respective shafts 18 by suitable bearings 21. Each roller could have a covering of high friction material.

An endless web W, such as a conveyor belt or a product being manufactured or treated (e.g., a film) travels along the rollers, the web being advanced by a suitable conventional drive mechanism (not shown).

As heretofore described, the conveyor system could be conventional. In accordance with the invention, however each shaft 18 is associated with not merely two holes H, but rather with a set of mounting holes H (ten such holes being depicted) formed in the conveyor frame 12. One set of mounting holes is depicted in FIG. 3 and comprises a first series of holes 30A–E formed in the first side support 14, and a second series of holes 32A–E formed in the second side support 16. Although the set of mounting holes is depicted as being ten in number, it will be appreciated that any even number of holes greater than two could be provided.

One end of the shaft associated with the set of holes is mounted in a selected one of the holes 30A–E of the first series, and the other end of the shaft is mounted in a selected one of the holes 32A–E of the second series.

The holes of each series are spaced apart in a direction parallel to the longitudinal axis L. Furthermore, the holes of each series are aligned with respective holes of the other series to form pairs of aligned holes. Thus, the holes 30A, 32A are aligned with one another to form a pair of aligned holes; the holes 30B, 32B are aligned with one another to form another pair of aligned holes; etc.

Each pair of aligned holes defines a rotary axis. Thus, the holes 30A, 32A form an axis A; the holes 30B, 32B form an axis B; etc.

The holes 30A–E of the first series are spaced longitudinally apart by a first distance X, whereas the holes 32A–E of the second series are spaced longitudinally apart by a second distance X+Y (i.e., the second distance is greater than the first distance by an amount Y). That means that the axes A–E are not mutually parallel, but rather are oriented obliquely (i.e., neither parallel nor perpendicular) relative to one another. Thus, if the ends of the shaft are removed from one of the pairs of holes and inserted into another of the pairs, an angle $\alpha$ formed between the shaft and the longitudinal axis L will be changed.

Preferably, the axis A of one pair of the holes 30A, 32A is oriented perpendicular to the longitudinal axis L.

If, for example, a shaft had its ends mounted in the holes 30A, 32A and it were desired to reorient the shaft to a new angle $\alpha'$ whereby one end of the shaft is displaced along the longitudinal axis relative to the other end by a distance Y, then the shaft would be remounted into the holes 30B, 32B. On the other hand, if the shaft were required to be reoriented to a new angle $\alpha''$ whereby one end of the shaft is displaced along the longitudinal axis relative to the other end by a distance 2Y, then the shaft would be remounted into the pair of holes 30C, 32C.

It will be appreciated that the pairs of holes 30D–32D and 30E–32E define axes D and E that are inclined opposite to the direction of inclination of the axes B and C. Thus, the selection of axes B and C on the one hand or D and E on the other hand will depend upon the direction in which the web needs to be displaced, i.e., toward the side support 14 or the side support 16. Preferably, the axes D and E form angles with the axis L that are equal to the angles $\alpha'$ and $\alpha''$, respectively.

In accordance with the present invention, the provision of pairs of holes creates distinct positions of adjustment for the rolls and enables the adjustment to be made without the need for special tools. Furthermore, after unsuccessful attempts to achieve proper tracking of a web, an operator would be able to return the rollers to an original state, if desired, in order to initiate a new attempt to achieve tracking.

Although the invention has been described in connection with a roller structure comprised of a stationary shaft and a rotatable roller mounted thereon, the invention could also be employed with a roller structure wherein the roller is fixed to the shaft, and the shaft rotates within bearings mounted at the respective holes 30A–E and 32A–E.

An alternative way of holding the shaft 18 stationary would be to provide each shaft end with a tip of non-circular cross section which fits into holes 30A–E, 32A–E of corresponding non-circular cross section. Each tip would be spring-biased outwardly to enable the shaft length to be reduced to facilitate placement of the shaft between the side supports 14, 16. Then, the tips would be released to snap into the respective holes. Each tip could have a cross section that tapers in an outward direction to ensure that the tips fit snugly in their respective holes.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A conveying apparatus comprising:

a support structure including first and second straight side supports arranged parallel to one another on opposite sides of a longitudinal axis;

a plurality of roller structures each having opposite ends mounted in respective ones of the side supports; and an endless web mounted for travel along the rollers in the direction of the longitudinal axis;

each of the roller structures being associated with a set of mounting holes formed in the first and second side supports, whereby each set of holes comprises a first series of holes formed in the first side support and a second series of holes formed in the second side support, one end of the associated roller structure being mounted in a selected one of the holes of the first series, and the other end of the associated roller structure mounted in a selected one of the holes of the second series;

the holes of each series being spaced apart in a direction parallel to the longitudinal axis;

each hole of the first series being aligned with a respective hole of the second series to form a pair of aligned holes, each pair of aligned holes defining a rotary axis, the rotary axes of the pairs of holes of each set of mounting holes being oriented obliquely to one another whereby the associated roller structure can be removed from one of the pairs of holes and inserted into another of the pairs of holes to change an angle between the roller structure and the longitudinal axis.

2. A conveyor apparatus comprising:

a support structure including first and second straight side supports arranged parallel to one another on opposite sides of a longitudinal axis;

a plurality of stationary shafts each having opposite ends mounted in respective ones of the side supports;

rollers mounted for rotation on respective ones of the shafts; and an endless web mounted for travel along the rollers in the direction of the longitudinal axis;

each of the shafts being associated with a set of mounting holes formed in the first and second side supports, whereby each set of holes comprises a first series of holes formed in the first side support and a second series of holes formed in the second side support, one end of the associated shaft being mounted in a selected one of the holes of the first series, and the other end of the associated shaft being mounted in a selected one of the holes of the second series;

the holes of each series being spaced apart in a direction parallel to the longitudinal axis;

each hole of the first series being aligned with a respective hole of the second series to form a pair of aligned holes, each pair of holes defining a rotary axis, the rotary axes of the pairs of holes of each set of mounting holes being oriented obliquely to one another whereby the associated shaft can be removed from one of the pairs of holes and inserted into another of the pairs of holes to change an angle between the shaft and the longitudinal axis.

3. The conveyor apparatus according to claim 2 wherein the holes of the first series of holes are spaced apart by a first distance in the direction of belt travel, and the holes of the second series of holes are spaced apart by a second distance greater than the first distance.

4. The conveyor apparatus according to claim 3 wherein one of the pairs of holes of each set of holes defines an axis extending perpendicular to the first and second side supports, and at least two additional pairs of holes of that set are inclined in mutually opposite directions relative to the longitudinal axis.

* * * * *